(12) United States Patent
Wei et al.

(10) Patent No.: US 10,522,116 B2
(45) Date of Patent: Dec. 31, 2019

(54) PROJECTION METHOD WITH MULTIPLE RECTANGULAR PLANES AT ARBITRARY POSITIONS TO A VARIABLE PROJECTION CENTER

(71) Applicant: Hangzhou YiYuQianXiang Technology Co., Ltd., Hangzhou (CN)

(72) Inventors: Pingting Wei, Hangzhou (CN); Ruizi Qin, Hangzhou (CN)

(73) Assignee: HANGZHOU YIYUQIANXIANG TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 15/979,774

(22) Filed: May 15, 2018

(65) Prior Publication Data

US 2018/0330698 A1 Nov. 15, 2018

(30) Foreign Application Priority Data

May 15, 2017 (CN) .......................... 2017 1 0340198

(51) Int. Cl.

| H04N 9/31 | (2006.01) |
|---|---|
| G06F 3/147 | (2006.01) |
| G09G 3/00 | (2006.01) |
| G06F 3/14 | (2006.01) |
| G06F 3/01 | (2006.01) |
| G06F 3/0481 | (2013.01) |
| G06T 15/00 | (2011.01) |
| G06T 19/00 | (2011.01) |

(Continued)

(52) U.S. Cl.
CPC ............... *G09G 5/38* (2013.01); *G06F 3/011* (2013.01); *G09G 3/003* (2013.01); *G09G 5/14* (2013.01); *G09G 2320/068* (2013.01); *G09G 2354/00* (2013.01)

(58) Field of Classification Search
USPC ................................................ 345/156, 633
See application file for complete search history.

(56) References Cited

U.S. PATENT DOCUMENTS

| 6,278,418 B1 * | 8/2001 | Doi .................. G09G 3/002 345/156 |
| 2005/0275915 A1 * | 12/2005 | Vesely ............... G02B 27/2221 359/13 |

(Continued)

*Primary Examiner* — Chineyere D Wills-Burns
(74) *Attorney, Agent, or Firm* — Gokalp Bayramoglu

(57) ABSTRACT

This invention provides a projection method with multiple rectangular planes at arbitrary positions to a variable projection center, including: obtaining a user viewpoint position; comparing a horizontal field of view angle between the user viewpoint position and each visual plane with a predetermined range, wherein if the horizontal field of view angle fails to be within the predetermined range, the user viewpoint position is updated to a new user viewpoint position, such that the horizontal field of view angle between the new user viewpoint position and each visual plane is just within the predetermined range; and respectively generating projection channel corresponding to each visual plane based on the user viewpoint position and performing projecting. The technical solution of the present invention can achieve the information interaction between the projection position of the CAVE system and the actual visual position of the user and the processing of the information.

10 Claims, 6 Drawing Sheets

(51) Int. Cl.
*G09G 5/38* (2006.01)
*G09G 5/14* (2006.01)

(56) References Cited

U.S. PATENT DOCUMENTS

| | | | |
|---|---|---|---|
| 2011/0107216 A1* | 5/2011 | Bi | G06F 3/011 |
| | | | 715/716 |
| 2013/0225305 A1* | 8/2013 | Yang | A63F 13/00 |
| | | | 473/152 |
| 2016/0098862 A1* | 4/2016 | Wilson | G06T 19/006 |
| | | | 345/419 |
| 2016/0352872 A1* | 12/2016 | Fleureau | G06F 3/011 |
| 2017/0032718 A1* | 2/2017 | Yanai | G09F 19/14 |
| 2017/0151484 A1* | 6/2017 | Reilly | A63B 71/0622 |
| 2019/0051051 A1* | 2/2019 | Kaufman | G01C 21/32 |

\* cited by examiner

S100 acquiring a user viewpoint position

S101 comparing a horizontal field of view angle between the user viewpoint position and each visual plane with a predetermined range, wherein if the horizontal field of view angle fails to be within the predetermined range, the user viewpoint position is updated to a new user viewpoint position, so as to make the horizontal field of view angle between the new user viewpoint position and each visual plane just within the predetermined range

S102 respectively generating a projection channel corresponding to each visual plane and performing projecting based on the user viewpoint position

FIG. 2

PROJECTION METHOD WITH MULTIPLE RECTANGULAR PLANES AT ARBITRARY POSITIONS TO A VARIABLE PROJECTION CENTER

CROSS-REFERENCE TO RELATED APPLICATIONS

This Non-provisional application is based on upon and claims priority under 35 U.S.C. § 119(a) on Chinese Patent Application No. 201710340198.1 filed on May 15, 2017, the entire contents of which are hereby incorporated by reference.

TECHNICAL FIELD

The present invention relates to the technical field of imaging processing, and more particularly, to a projection method with multiple rectangular planes at arbitrary positions to a variable projection center.

BACKGROUND

A cave automatic virtual environment (CAVE) projection system is a large virtual reality (VR) system, with high degrees of immersion and interactivity. The CAVE projection system can fuse vision, touch, sound and other senses, and can track head movement along 6 degrees of freedom. The principles of a CAVE immersive virtual reality display system are relatively complex. It is based on computer graphics, and perfectly fuses the high-resolution three-dimensional projection display technology, multi-channel visual synchronization technology, three-dimensional computer graphics technology, audio technology, sensor technology and so on. The CAVE immersive virtual reality display system is therefore able to produce a completely immersive virtual environment surrounded by a three-dimensional projection images and can be used by multiple people. At present, real-time high-resolution multi-window content rendering of a complex scene is mainly applied to the CAVE system. The CAVE projection system is a large VR system with high degree of immersion and interactivity. The CAVE projection system is a highly immersive virtual demonstration environment composed three or more (i.e. including three) hard rear-projection walls. An observer is surrounded by the virtual reality system with a plurality of images, and a plurality of projection surfaces form a virtual space. The common CAVE system projection space is a standard cubic structure, and the four independent projection channels finally form a space continuous projection image.

However, when rendering a scene and generating content-based images to output in an existing CAVE system, projection windows should be fixed beforehand, namely, the position and orientation of the projection screen should be fixed. In addition, the projection windows cannot be placed at arbitrary positions, so that the data interaction with the real visual position of a user cannot be carried out, resulting in a poor visual feeling of the user. Moreover, since the process and feedback of image data are adversely affected, the output efficiency of images is decreased.

SUMMARY

The technical problem to be solved by the technical solution of the present invention is how to achieve information interaction between the projection position of the CAVE system and the real visual position of the user and how to process the information, so as to achieve effective output of the image data.

To solve the above-mentioned problems, a projection method with multiple rectangular planes at arbitrary positions and a variable projection center is provided by the technical solution of the present invention. Based on a CAVE system, the CAVE system includes a visual platform, and the visual platform includes a plurality of visual planes. The projection method includes acquiring a user viewpoint position;

comparing a horizontal field of view angle between the user viewpoint position and each visual plane with a predetermined range, wherein if the horizontal field of view angle fails to be within the predetermined range, the user viewpoint position is updated to a new user viewpoint position, so as to make the horizontal field of view angle between the new user viewpoint position and each visual plane just within the predetermined range; and respectively generating a projection channel corresponding to each visual plane and performing projecting based on the user viewpoint position.

Optionally, the user viewpoint position may include: a coordinate of the user relative to the visual platform.

Optionally, comparing the horizontal field of view angle between the user viewpoint position and each visual plane with the predetermined range may include:

taking the user viewpoint position as an origin of a coordinate system, establishing a perspective coordinate system, and calculating a directed distance from the origin of the coordinate system to each visual platform along a projection direction; and acquiring the horizontal field of view angle between the user viewpoint position and each visual plane based on the origin of the coordinate system and the directed distance.

Optionally, the horizontal field of view angle between the user viewpoint position and each visual plane may refer to an angle range of each visual plane within the horizontal field of view of the user, a direction of the directed distance of each visual plane may be taken as a 0° direction for the horizontal field of view of the user, and the predetermined range may be an angle range covered by rotating the 0° direction clockwise or counterclockwise by 60° to 100°, respectively.

Optionally, the predetermined range may be from 45° to 135°.

Optionally, updating the user viewpoint position to the new user viewpoint position such that the horizontal field of view angle between the new user viewpoint position and each visual plane is just within the predetermined range may include:

acquiring a coordinate of a point on an extension line of a connection line between an original user viewpoint position and a midpoint of a corresponding visual plane as a quasi-position; and if the horizontal field of view angle between the quasi-position and each visual plane falls within the predetermined range, and a distance between the quasi-position and the original user viewpoint position is the shortest, then taking the quasi-position as the new user viewpoint position.

Optionally, a projection channel $S_f$ of a corresponding visual plane f of the user viewpoint position may be obtained based on the following formula:

$$S_f = \begin{pmatrix} \dfrac{2N}{\text{right}-\text{left}} & 0 & \dfrac{\text{right}+\text{left}}{\text{right}-\text{left}} & 0 \\ 0 & \dfrac{2N}{\text{top}-\text{bottom}} & \dfrac{\text{top}+\text{bottom}}{\text{top}-\text{bottom}} & 0 \\ 0 & 0 & -\dfrac{F+N}{F-N} & \dfrac{-2FN}{F-N} \\ 0 & 0 & -1 & 0 \end{pmatrix}$$

wherein, N may be a distance from the user viewpoint position to a near clip plane of the visual plane f, F may be a distance from the user viewpoint to a far clip plane of the visual plane f, right, left, top, and bottom represent the lengths of four sides of the visual plane f, respectively, and f may be a natural number greater than one.

Optionally, the projection method may further include:

taking each visual plane as a corresponding initial projection surface for the user viewpoint position to each visual plane;

successively calculating values of the lengths of four sides of a projection space according to a position of the initial projection surface;

determining a user viewpoint plane based on the user viewpoint position and a directed distance from the user viewpoint position to each visual platform along the projection direction;

taking a nearest plane distance from the user viewpoint plane to each visual plane as a distance between the user viewpoint plane and a near clip plane of a respective visual plane; and taking a farthest plane distance from the user viewpoint plane to each visual plane as a distance between the user viewpoint plane and a far clip plane of a respective visual plane.

The technical solution of the present invention has at least the following advantages:

By using the technical solution of the present invention, a specified number of visual planes (i.e. projection screens) can be placed in a preset scene, and the relative positions among the visual planes and the orientations thereof can be randomly specified according to the establishment of variable projection channels and projection method of the technical solution of the present invention. Regarding the unreasonable user viewpoints detected during an observation process of the user, a re-projection can be performed according to the method of updating new user viewpoint, so as to achieve the interaction of the projection positions of the CAVE system and thus realize the effective output of image data.

The technical solution of the present invention performs real scene simulation based on the CAVE system. The user observation effects are detected based on planar objects under the condition where the user faces a plurality of visual planes, so an optimal observation viewing angle at any spatial position can be achieved to satisfy the user. Under the condition where the positions of multiple projection planes are given, a projection result with real-time high-resolution image can be achieved according to the changes of the viewpoint position in real-time.

The projection method provided by the technical solution of the present invention can support a placement of the projection windows at arbitrary positions and ensures that the content that the user sees through the window is in accordance with an effect that the user sees through the window in a display scene even if the user moves. The position of the user is input as the coordinate of the observation viewpoint in real-time during the projection process and taken as a variable to calculate the new projection surface. If there is an unreasonable user viewpoint, a new user viewpoint will be established according to the technical solution of the present invention, the user viewpoint is limited at the nearest reasonable position on the extension line of the connection line between the viewpoint position and the centre of the screen, and the needs of multiple screens are satisfied at the same time, such that the continuity of the images can be ensured while the roaming experience of the user would not be affected.

BRIEF DESCRIPTION OF THE DRAWINGS

By reading the detailed descriptions of the non-limiting embodiments with reference to the following drawings, other features, objectives, and advantages of the present invention will become more obvious.

FIG. 2 is a flow schematic diagram of a projection method with multiple rectangular planes at arbitrary position and variable projection center according to the technical solution of the present invention;

DETAILED DESCRIPTION

In order to clearly illustrate the technical solution of the present invention, the detailed descriptions will be presented with reference to the drawings hereinafter.

Figure 1:
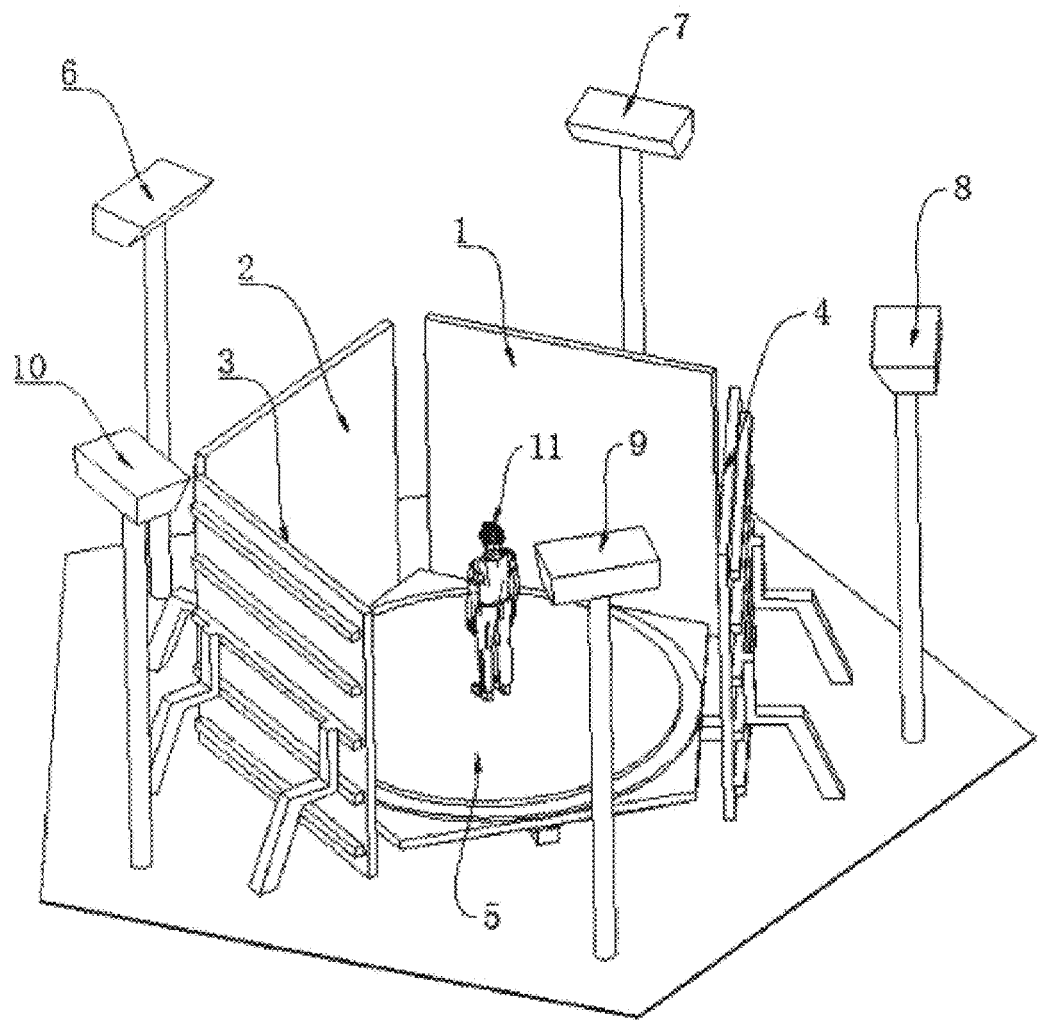
FIG. 1 is a structural schematic diagram of a CAVE system according to the technical solution of the present invention.

As shown in FIG. 1, a CAVE system includes a projection array and a visual platform, wherein, the projection array includes a plurality of projectors 6-10, and the visual platform includes a plurality of visual planes 1-5. The visual plane is a projection screen, which is also known as a projection surface. According to an embodiment of the CAVE system, the projection array includes five projectors, and the five projectors are arranged in a pentagonal shape. The visual planes include four transversely arranged visual projection screens 1-4 and one bottom visual projection screen 5. The five projectors project images to five planes of the visual planes, respectively, and are respectively connected to a data host to form the projection image. The user 11 stands on the bottom visual projection screen 5 in use. Generally, the sight line of the user is defined regarding the transversely arranged visual projection screens 1-4 in the present invention. Obviously, the above-mentioned visual planes and projectors may be placed in any position and the number thereof is arbitrary. The placement position and the number of the above-mentioned visual planes and projectors are not limited in the present invention.

In the rendering of scenes and generation of content-based images for outputting of the existing CAVE system, the positions and orientations of the projection windows should be previously fixed, and the projection windows cannot be placed at any position with respect to each other.

In order to enable the placement of the projection windows at any position (the projection window is defined by establishing new projection channel in the technical solution of the present invention). The projection surface of a projection center which is relatively fixed at a certain moment has an irregular polygonal shape. Here, if a conventional projection method is used, the image acquired has irregular quadrilateral shape. A "void" or a "ripple" formed by stretching would appear at the jointing position of the images. To prevent these situations, the technical solution of the present invention provides a method for calculating a new projection plane, by which the projection channel can be redefined according to the actual visual position of the user, so that the projection windows can be placed at any position, the effective output of the images can be realized, and the visual images with good quality can be established.

In the technical solution of the present invention, the directed distance to the screen along the projection direction of the viewpoint is firstly calculated according to the user viewpoint position, then the rationality of the relative position between the viewpoint and the screen is determined, after that a nearest reasonable position on an extension line of the line between the unreasonable point and the centre of the screen is found and redefined as the viewpoint position. Considering the possible splicing problems of a plurality of screens, if there is an unreasonable point position, each screen will be detected to find out a common point position that satisfies each screen. Subsequently, according to a projection equation, the value of each parameter of the new projection surface is calculated, and the lengths of four sides such as a length, width, and height etc. of the projection space are calculated to determine the near clip plane and far clip plane from the user viewpoint to the projection surface, so as to generate a new irregular projection matrix. Finally, the projection matrix of each screen is invoked respectively to obtain a real-time rendered 3D image.

In the projecting process, the position of the user is input in real-time as the coordinate of the observation viewpoint, and taken as a variable to calculate the new projection surface. During this process, some viewpoint position may be unreasonable, in order to deal with this situation, an algorithm with the smallest change in quantity is used in the technical solution of the present invention to limit the unreasonable viewpoint to the nearest reasonable position on the extension line of the line between this position and the centre of the screen, meet the requirements of a plurality of screens at the same time, thereby ensuring the continuity of images without affecting the roaming experience of the user.

Specifically, referring to FIG. 2, the technical solution of the present invention provides a projection method with multiple rectangular planes at arbitrary position and a variable projection center, including following steps:

S100, acquiring a user viewpoint position;

S101, comparing a horizontal field of view angle between the user viewpoint position and each visual plane with a predetermined range, wherein if the horizontal field of view angle fails to be within the predetermined range, the user viewpoint position is updated to a new user viewpoint position, such that the horizontal field of view angle between the new user viewpoint position and each visual plane is just within the predetermined range; and S102, respectively generating a projection channel corresponding to each visual plane and performing projecting based on the user viewpoint position.

According to S100, the user viewpoint position includes: a coordinate of the user relative to the visual platform. The user viewpoint position can directly collect the spatial position information of the visual platform where the user is located, and the above-mentioned position information can be determined according to the coordinate system preset in the CAVE system.

According to S101, comparing the horizontal field of angle between the user viewpoint position and each visual plane with the predetermined range includes:

taking the user viewpoint position as an origin of the coordinate system, establishing a perspective coordinate system, and calculating a directed distance from the origin of the coordinate system to each visual platform along a projection direction; and acquiring the horizontal field of view angle between the user viewpoint position and each visual plane based on the origin of the coordinate system and the directed distance.

The perspective coordinate system may be a three dimensional coordinate system. The directed distance is substantially a vector, which not only has a distance value, but also has a direction. The a horizontal plane is defined by the directed distance in the perspective coordinate system, and the horizontal plane is the plane where the horizontal field of view lies in. All the directed distances from the user viewpoint to each of the visual planes are on the horizontal plane.

Apparently, in the execution of S101, the perspective coordinate system may not be established, and the horizontal plane where the directed distance from the origin of the coordinate system to each visual platform along the projection direction is located is directly used as the plane where the horizontal field of view is located.

More specifically, the horizontal field of view angle between the user viewpoint position and each visual plane is an angle range of each visual plane within the horizontal field of view of the user. The direction of the directed distance of the visual plane is taken as a 0° direction for the horizontal field of view of the user. The angle of rotating the 0° direction clockwise or counterclockwise respectively is defined as the angle of the horizontal field of view.

When the horizontal field of view angle of the visual plane is defined as the angle range of each visual plane within the horizontal field of view (for example, the angle range of one visual plane is from 10° counterclockwise to 90° counterclockwise), the predetermined range is the angle range covered by rotating the 0° direction clockwise or counterclockwise by 60° to 100°, respectively.

When the horizontal field of view angle of each visual plane is defined as an angle difference of the horizontal field of view where each visual plane lies in (for example, the angle range of one visual plane is the angle difference of 10 counterclockwise and 90° counterclockwise, which is 80°), then the predetermined range is from 45° to 135°.

The setting of the above-mentioned angle range and the definition of the horizontal field of view angle of the visual plane may be input and set according to the requirements, and this embodiment is not limited to thereto particularly.

According to S101, the step of updating the user viewpoint position to the new user viewpoint position such that the horizontal field of view angle between the new user viewpoint position and each visual plane is just within the predetermined range includes:

acquiring a coordinate of a point on an extension line of a connection line between an original user viewpoint position and a midpoint of a corresponding visual plane as a quasi-position; and if the horizontal field of view angle between the quasi-position and each visual plane falls within the predetermined range, and a distance between the quasi-position and the original user viewpoint position is the shortest, taking the quasi-position as the new user viewpoint position.

More specifically, in the present embodiment, the step of acquiring a coordinate of a point on an extension line of a connection line between an original user viewpoint position and a midpoint of a corresponding visual plane as a quasi-position adopts a way of taking an arbitrary point on the extension line of the midpoint of the corresponding visual plane. Preferably, the visual plane corresponding to the selected extension line does not meet the requirement of the horizontal field of view angle determined by the original user visual position.

The horizontal field of view angle between the quasi-position and each visual plane falling within the above-mentioned predetermined range means that the horizontal field of view angles between the quasi-position and each of the visual planes should meet the numerical requirement of the above-mentioned predetermined range at the same time.

According to S102, the projection channel $S_f$ of the corresponding visual plane f of the user viewpoint position is obtained based on the following formula:

$$S_f = \begin{pmatrix} \frac{2N}{\text{right}-\text{left}} & 0 & \frac{\text{right}+\text{left}}{\text{right}-\text{left}} & 0 \\ 0 & \frac{2N}{\text{top}-\text{bottom}} & \frac{\text{top}+\text{bottom}}{\text{top}-\text{bottom}} & 0 \\ 0 & 0 & -\frac{F+N}{F-N} & \frac{-2FN}{F-N} \\ 0 & 0 & -1 & 0 \end{pmatrix}$$

wherein, N is a distance from the user viewpoint position to a near clip plane of the visual plane f, F is a distance from the user viewpoint to a far clip plane of the visual plane f, right, left, top, and bottom represent lengths of four sides of the visual plane f, respectively, and f is a natural number greater than one.

One preferred solution in this embodiment further includes the following process steps of calculating each parameter in the above-mentioned formula, which specifically includes:

taking each visual plane as a corresponding initial projection surface from the user viewpoint position to each visual plane;

successively calculating values of the lengths of four sides of a projection space according to a position of the initial projection surface;

determining a user viewpoint plane based on the user viewpoint position and a directed distance from the user viewpoint position to each visual platform along a projection direction;

taking a nearest plane distance from the user viewpoint plane to each visual plane as a distance from the user viewpoint plane to a near clip plane of the respective visual plane; and taking a farthest plane distance from the user viewpoint plane to each visual plane as a distance from the user viewpoint plane to a far clip plane of the respective visual plane.

Figure 3:
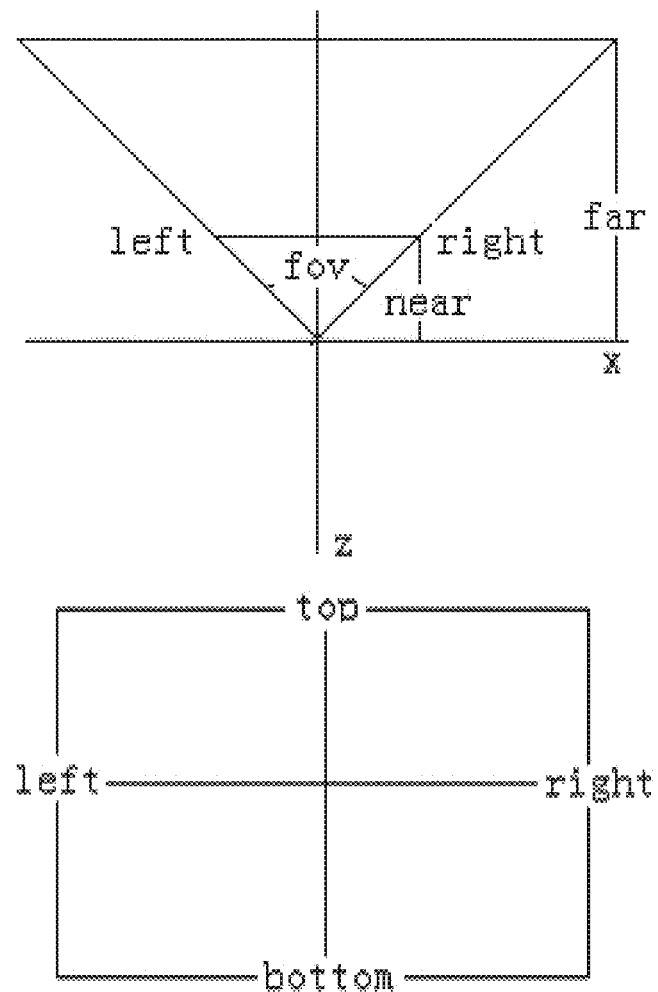
FIG. 3 is a schematic diagram showing a data structure of one actual projection channel according to the technical solution of the present invention.

FIG. 3 is a schematic diagram of an actual projection channel. The x-z coordinate plane is the plane where the horizontal field of view lies in, wherein the lengths of the four sides of the visual plane: right, left, top and bottom, the distance of the far clip plane: far, and the distance of the near clip plane: near are presented.

In the execution of S102, according to the above-mentioned projection equation, the value of each parameter of the new projection surface and the lengths of four sides such as length, width, and height etc. of the projection space are calculated, such that the near clip surface and far clip surface are determined to generate a new irregular projection matrix. Finally, the projection matrix of each screen is invoked respectively to obtain a real-time rendered 3D image.

Embodiment

Figure 4:
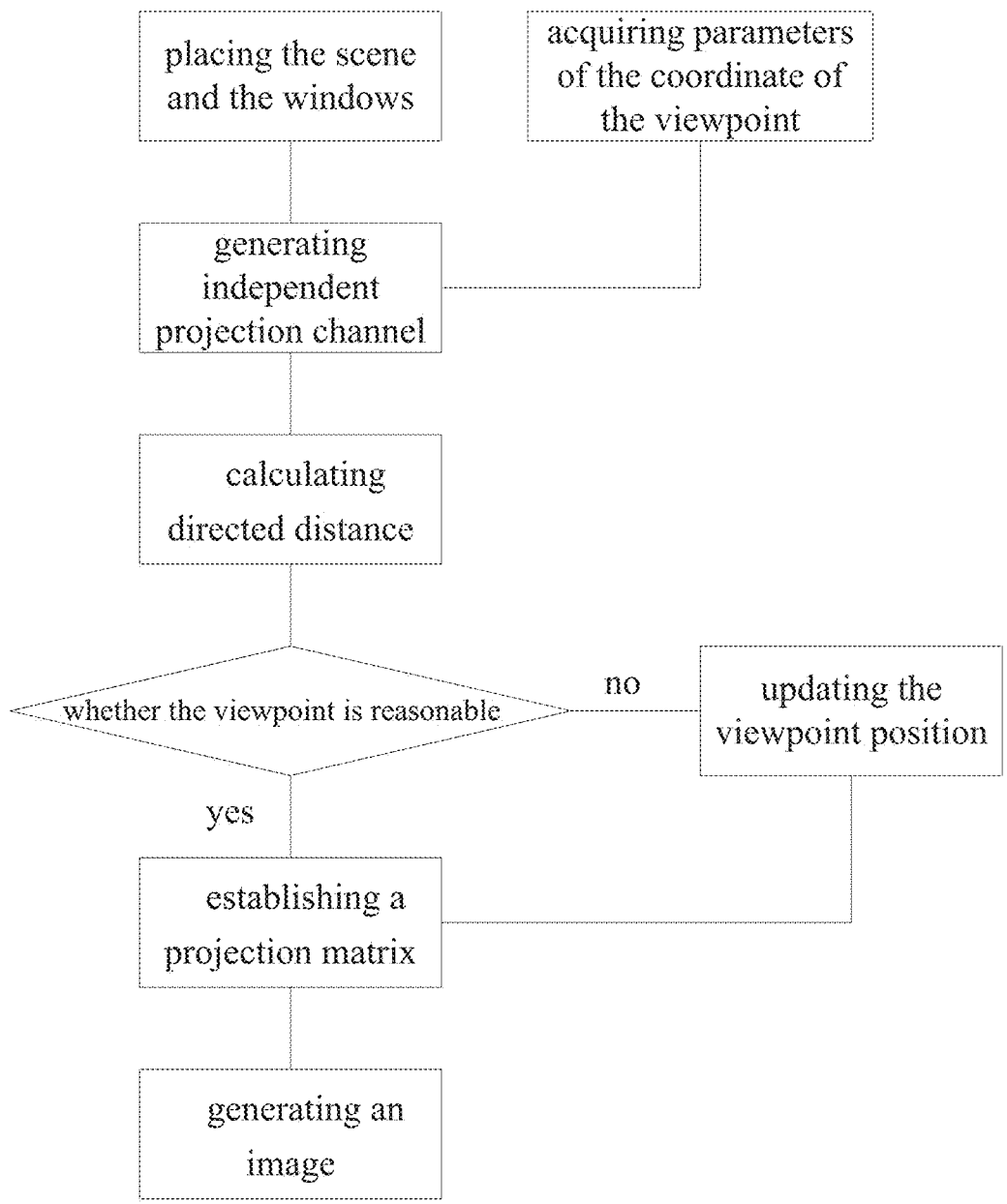
FIG. 4 is a flow schematic diagram of one implementation according to the technical solution of the present invention.

According to the technical solution of the present invention, one embodiment is provided below, referring to FIG. 4, the present invention includes the following steps:

placing five projection screens in a well-established scene according to the requirements (the placement manner shown in FIG. 1 may be taken for reference), namely, establishing the placement of the scene and the windows;

for each projection screen, generating an independent projection channel from the original viewpoint position, respectively (i.e., the actual viewpoint position where the original user is located);

establishing the perspective coordinate system, and taking the viewpoint position as the origin of the coordinate system; wherein for each screen, the directed distance from the viewpoint (x0, y0, z0) to the screen (the equation of the plane where the screen is located is Ax+By+Cz+D=0) along the projection direction is calculated (the reference formula for the directed distance is:

$$d = \frac{|Ax0 + By0 + Cz0 + D|}{\sqrt{A^2 + B^2 + C^2}}),$$

after that, the rationality of the relative position of the viewpoint and the screen is determined (if the horizontal field of view angle between the viewpoint and the screen is smaller than 135° and bigger 45°, the relative position is a reasonable position, otherwise, the relative position is an unreasonable position), for the unreasonable viewpoint position, the new viewpoint is defined as the nearest reasonable position on the extension line of a connection line between the viewpoint position and the centre of the screen, namely, the viewpoint that satisfies the threshold of the horizontal field of view, and the feedback is given;

subsequently, taking the screen position as an initial position p0 of the projection surface, and then calculating the values of the length, width and height of the projection space successively according to the position of the projection surface to determine the near clip plane and the far clip plane, so as to generate a new irregular projection matrix, rapidly (the algorithm for generating projection channel presented in this embodiment may be taken for reference); and outputting the real-time imaging result of each projection channel to the five screens, wherein the observation results will be changed corresponding to the movement of the viewpoint position.

Figure 5:
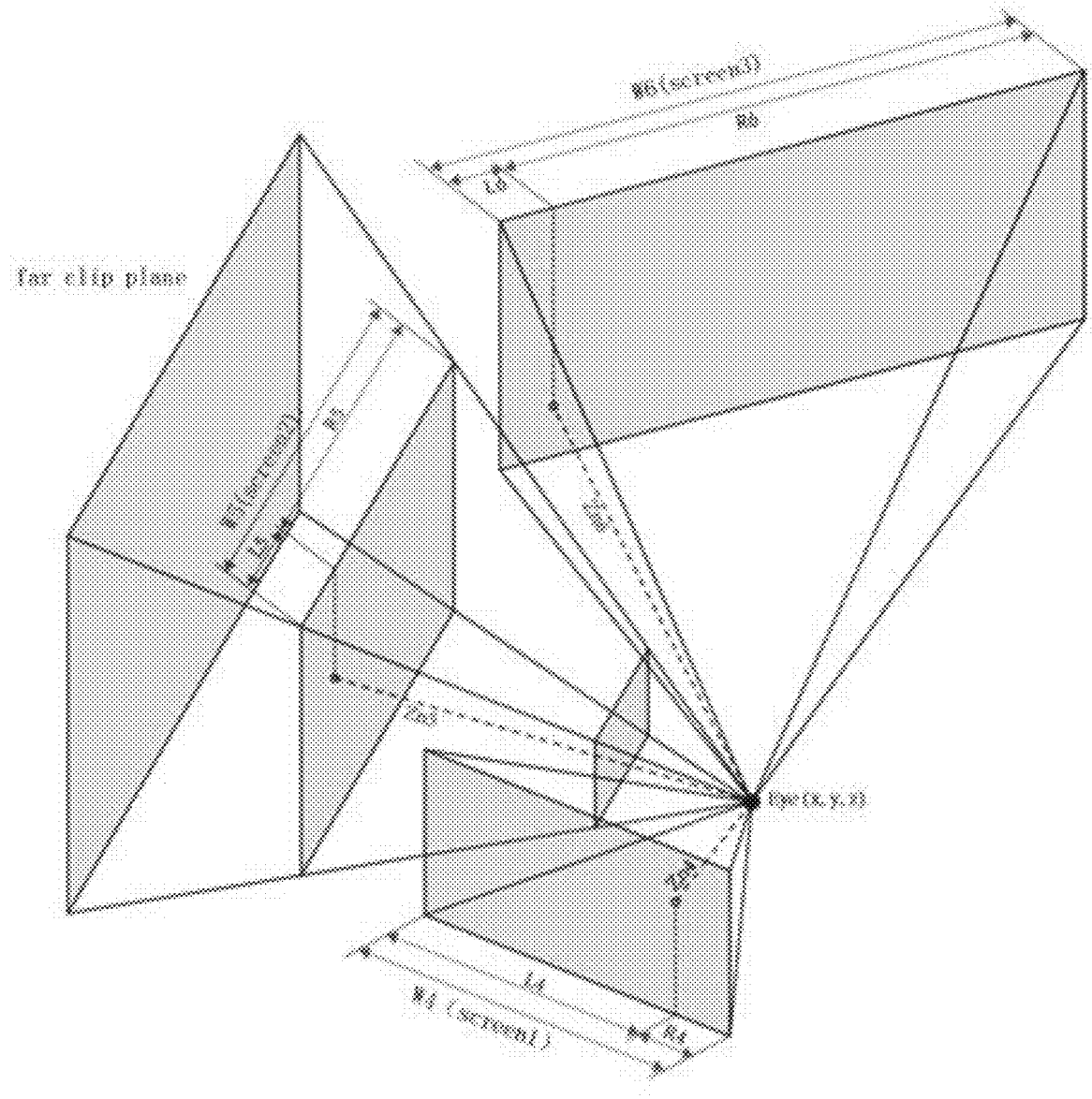
FIG. 5 is a schematic diagram showing the placement of projection surfaces (i.e., a visual planes) of an implementation according to the technical solution of the present invention.

FIG. 5 shows a position relation of the placement of one projection surface and a viewpoint position Eye (x, y, z)

according to the present embodiment, which includes projection screens 1-3. The projection distance of the viewpoint position Eye (x, y, z) relative to the screen 1 is Zn4, the width of the screen 1 is W4, the horizontal distance from the viewpoint position Eye (x, y, z) to one side of the screen 1 is L4, and the horizontal distance from the viewpoint position to the other side of the screen 1 is R4. Similarly, the projection distance of the viewpoint position Eye (x, y, z) relative to the screen 2 is Zn5, the width of the screen 2 is W5, the horizontal distance from the viewpoint position Eye (x, y, z) to one side of the screen 2 is L5, and the horizontal distance from the viewpoint position to the other side of the screen 2 is R5. The projection distance of the viewpoint position Eye (x, y, z) relative to the screen 3 is Zn6, the width of the screen 3 is W6, the horizontal distance from the viewpoint position Eye (x, y, z) to one side of the screen 3 is L6, and the horizontal distance from the viewpoint position to the other side of the screen 3 is R6. The schematic diagram showing the position of the far clip plane is shown in FIG. 5 for reference.

Figure 6:
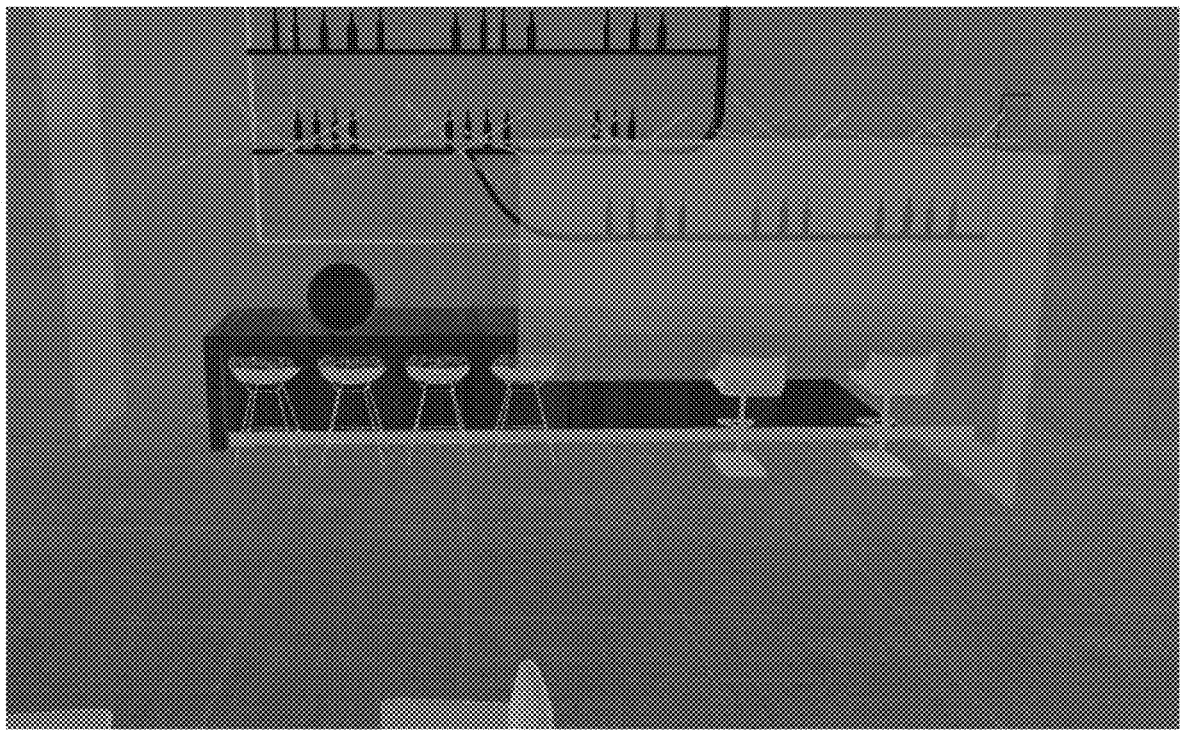
FIG. 6 is a schematic diagram showing a scene in the use of the CAVE system according to the technical solution of the present invention.
Figure 7:
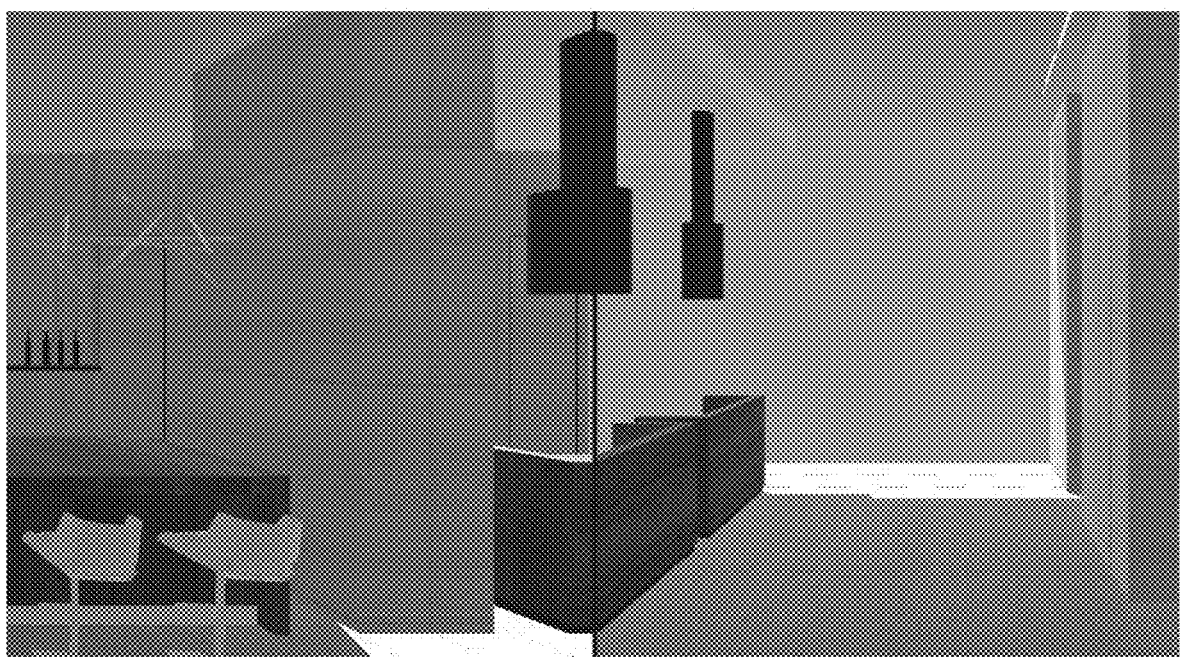
FIG. 7 is a schematic diagram showing an imaging effect of a CAVE system with dual-screen project simultaneously according to the technical solution of the present invention.

FIG. 6 and FIG. 7 show the generated projection effect according to the present embodiment for reference. FIG. 6 is a schematic diagram showing a scene of the CAVE system in use, and FIG. 7 is a schematic diagram showing an imaging effect of a dual-screen simultaneous projection.

Although the specific embodiments of the present invention are described above, it should be understood that the present invention is not limited to the specific implementations described above. Various variations or modifications may be derived within the scope of the appended claims by those of ordinary skill in the art which should also be considered as falling within the substantial content of the present invention.

What is claimed is:

1. A projection method with multiple rectangular planes at arbitrary position to a variable projection center, wherein the projection method is based on a cave automatic virtual environment (CAVE) system which comprises a visual platform, and the visual platform comprises a plurality of visual planes; the projection method comprises:
   acquiring a user viewpoint position;
   comparing a horizontal field of view angle between the user viewpoint position and each visual plane with a predetermined range, wherein if the horizontal field of view angle fails to be within the predetermined range, the user viewpoint position is updated to a new user viewpoint position, so as to make the horizontal field of view angle between the new user viewpoint position and each visual plane just within the predetermined range, otherwise the user viewpoint position is not updated; and
   respectively generating a projection channel corresponding to each visual plane and performing projecting based on the user viewpoint position.

2. The projection method according to claim 1, wherein the user viewpoint position comprises a coordinate of the user relative to the visual platform.

3. The projection method according to claim 2, wherein the predetermined range is from 45° to 135°.

4. The projection method according to claim 1, wherein the step of comparing a horizontal field of view angle between the user viewpoint position and each visual plane with a predetermined range comprising:
   taking the user viewpoint position as an origin of a coordinate system, establishing a perspective coordinate system, and calculating a directed distance from the origin of the coordinate system to each visual platform along a projection direction; and
   acquiring the horizontal field of view angle between the user viewpoint position and each visual plane based on the origin of the coordinate system and the directed distance.

5. The projection method according to claim 4, wherein the horizontal field of view angle between the user viewpoint position and each visual plane is an angle range of each visual plane within the horizontal field of view of the user, a direction of a directed distance of each visual plane is taken as a 0° direction for the user horizontal field of view of the user, and the predetermined range is an angle range covered by rotating the 0° direction clockwise or counter-clockwise by 60° to 100°, respectively.

6. The projection method according to claim 4, wherein the predetermined range is from 45° to 135°.

7. The projection method according to claim 1, wherein the predetermined range is from 45° to 135°.

8. The projection method according to claim 1, wherein the step of updating the user viewpoint position to the new user viewpoint position such that the horizontal field of view angle between the new user viewpoint position and each visual plane is just within the predetermined range comprises:
   acquiring a coordinate of a point on an extension line of a connection line between an original user viewpoint position and a midpoint of a corresponding visual plane as a quasi-position; and
   if the horizontal field of view angle between the quasi-position and each visual plane falls within the predetermined range and a distance between the quasi-position and the original user viewpoint position is the shortest, taking the quasi-position as the new user viewpoint position.

9. The projection method according to claim 1, wherein a projection channel $S_f$ of a corresponding visual plane f of user viewpoint position is obtained based on the following formula:

$$S_f = \begin{pmatrix} \frac{2N}{\text{right} - \text{left}} & 0 & \frac{\text{right} + \text{left}}{\text{right} - \text{left}} & 0 \\ 0 & \frac{2N}{\text{top} - \text{bottom}} & \frac{\text{top} + \text{bottom}}{\text{top} - \text{bottom}} & 0 \\ 0 & 0 & -\frac{F+N}{F-N} & \frac{-2FN}{F-N} \\ 0 & 0 & -1 & 0 \end{pmatrix}$$

wherein, N is a distance from the user viewpoint position to a near clip plane of the visual plane f, F is a distance from the user viewpoint to a far clip plane of the visual plane f, right, left, top, and bottom represent lengths of four sides of the visual plane f, respectively, and f is a natural number greater than one.

10. The projection method according to claim 9, further comprising:
   taking each visual plane as a corresponding initial projection surface for the user viewpoint position to each visual plane;
   successively calculating values of the lengths of four sides of a projection space according to a position of the initial projection surface;
   determining a user viewpoint plane based on the user viewpoint position and a directed distance from the user viewpoint position to each visual platform along a projection direction;

taking a nearest plane distance from the user viewpoint plane to each visual plane as a distance between the user viewpoint plane and a near clip plane of a respective visual plane; and taking a farthest plane distance from the user viewpoint plane to each visual plane as a distance between the user viewpoint plane and a far clip plane of the respective visual plane.

\* \* \* \* \*